Nov. 18, 1930.  E. WIECZOREK  1,781,993
BRAKE MECHANISM WITH BRAKE BLOCK FOR MOTOR VEHICLES
Filed Sept. 28, 1928  4 Sheets-Sheet 1
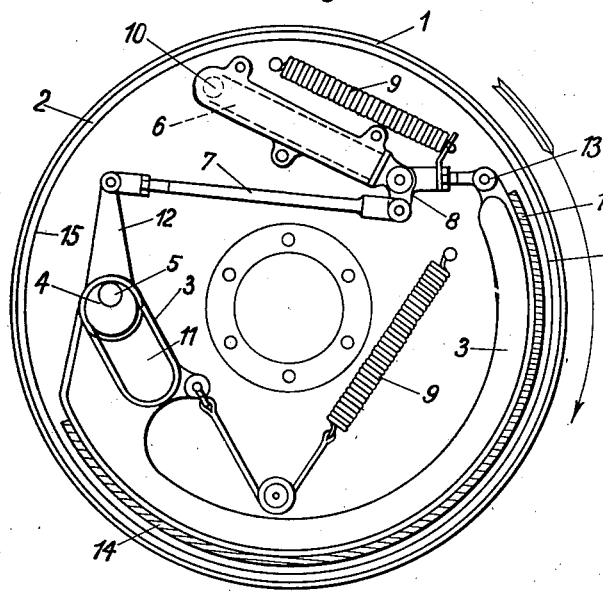
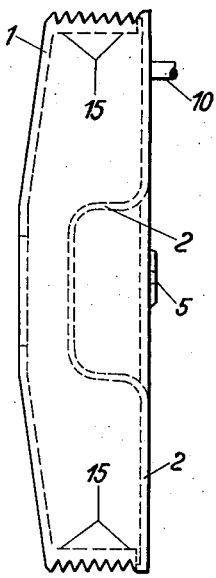
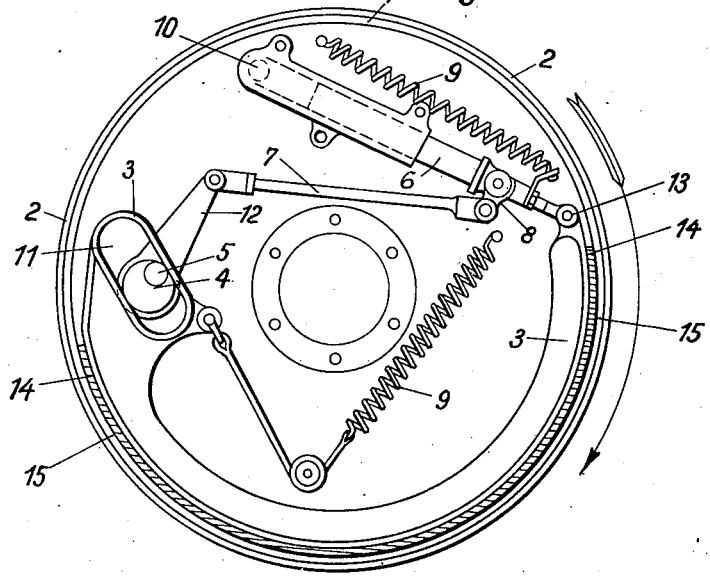
Inventor.

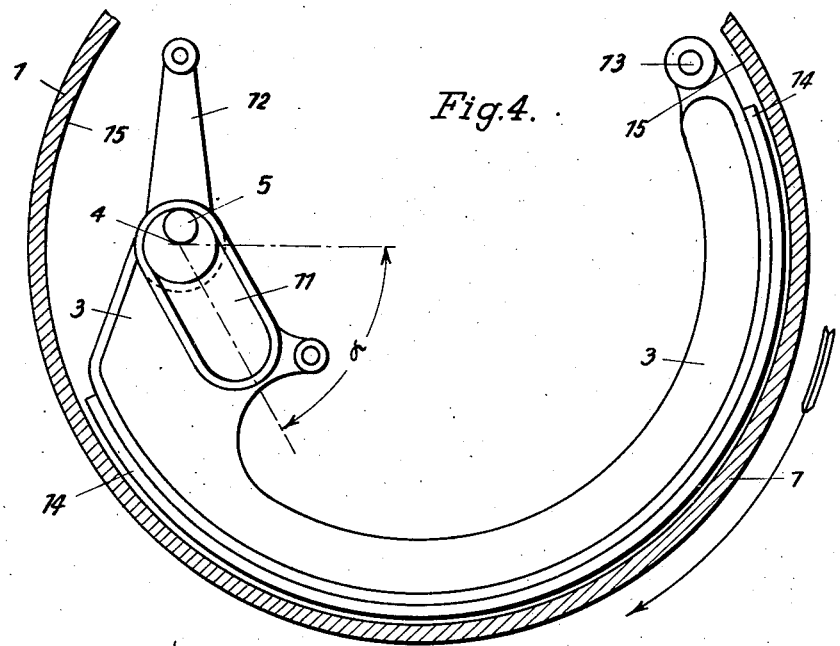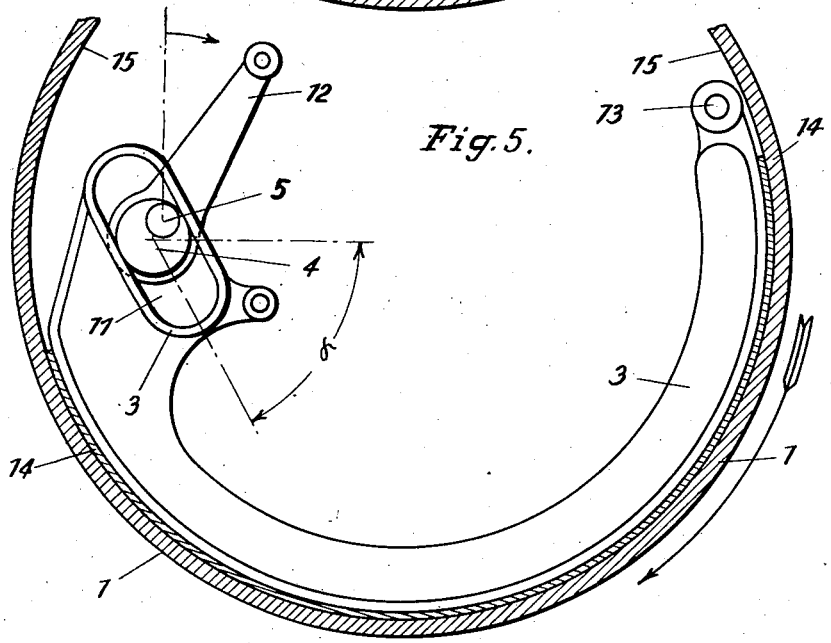

Nov. 18, 1930.   E. WIECZOREK   1,781,993
BRAKE MECHANISM WITH BRAKE BLOCK FOR MOTOR VEHICLES
Filed Sept. 28, 1928    4 Sheets-Sheet 3
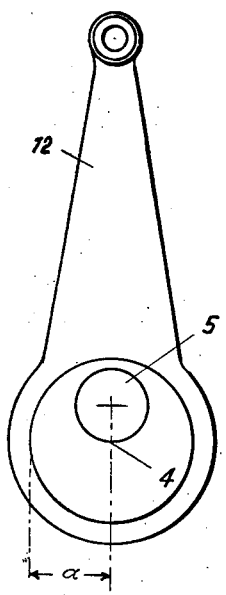
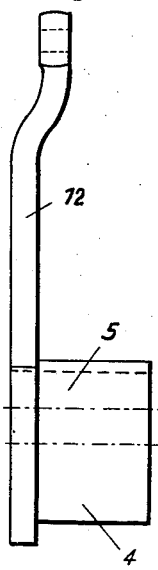
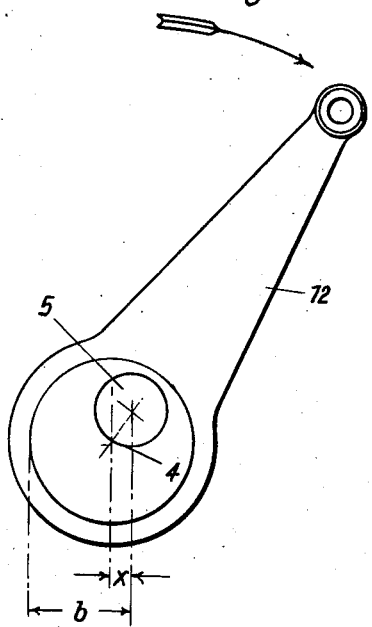
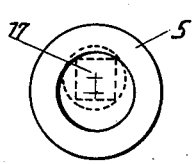
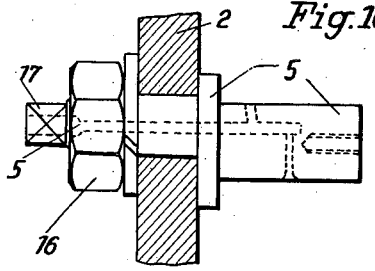
Inventor:
Emanuel Wieczorek Nov. 18, 1930.       E. WIECZOREK       1,781,993
BRAKE MECHANISM WITH BRAKE BLOCK FOR MOTOR VEHICLES
Filed Sept. 28, 1928     4 Sheets-Sheet 4
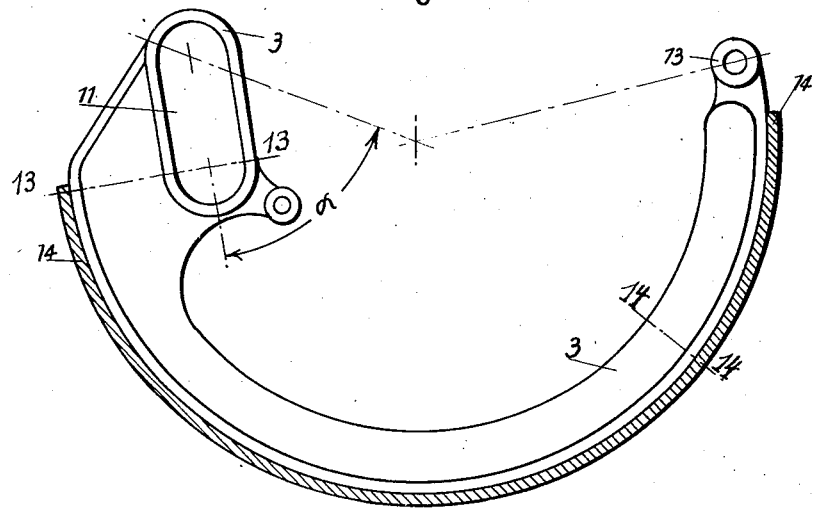
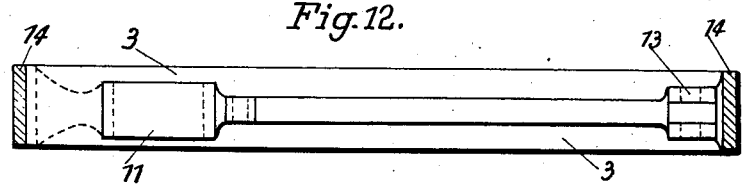
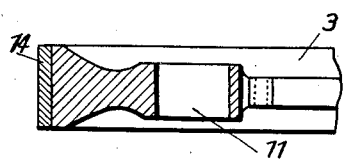
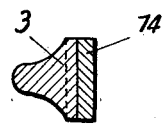
Inventor:
Emanuel Wieczorek Patented Nov. 18, 1930

1,781,993

UNITED STATES PATENT OFFICE

EMANUEL WIECZOREK, OF BRESLAU, GERMANY, ASSIGNOR TO RUDOLF KANDT, OF LEIPZIG, GERMANY

BRAKE MECHANISM WITH BRAKE BLOCK FOR MOTOR VEHICLES

Application filed September 28, 1928, Serial No. 308,945, and in Germany October 5, 1927.

Brake-mechanisms with brake block for motor-vehicles have become known, which are obliquely guided at one end on a bolt by means of an oblong slot, and the pressure of which is increased by the friction-force acting between brake drum and brake block. In these braking mechanisms of known type heavy brake blocks were always provided which are hingedly connected the one with the other. The brake mechanisms being composed of several elements, it requires especially careful attention and the inconvenience resulting therefrom is that, when one of the joints breaks or when one of the blocks breaks, the whole braking mechanism fails. The manufacturing of the brake-mechanism is difficult owing to the numerous hinged elements.

These inconveniences are obviated by the improvement which will be hereinafter described.

The novelty consists in that only one brake block is provided, the guide bolt of which is eccentrically mounted and connected to the pressing element by a system of hinged levers.

An embodiment of the invention is illustrated, by way of example, in the accompanying drawing, in which:—

Fig. 1 shows the brake-mechanism for a motor-car the brake being in the inoperative state.

Fig. 2 shows in side elevation the brake drum and the brake block holder.

Fig. 3 is a similar view to Fig. 1, the elements being shown in the position during the braking.

Fig. 4 shows on an enlarged scale the brake block in the inoperative position.

Fig. 5 is a similar view showing the brake block in the operative position.

Fig. 6 shows in elevation the brake block lever on the block bolt.

Fig. 7 is a side elevation of Fig. 6.

Fig. 8 shows in elevation the brake block lever in the operative position.

Fig. 9 shows in top plan view the bolt on the brake block holder.

Fig. 10 shows in side elevation, partly in section, the bolt fixed on the brake-block-holder.

Fig. 11 shows in side elevation the brake-block alone.

Fig. 12 is a top plan view of Fig. 11.

Fig. 13 is a section on line 13—13 of Fig. 11.

Fig. 14 is a section on line 14—14 of Fig. 11.

Referring to the drawing 1 designates the brake drum, 2 the brake block holder, i. e. the stationary element of the brake. The brake block 3, as shown in Figs. 1 and 3, is pressed against the brake drum by an hydraulically operated piston 6. The brake drum 1 rotates in clockwise direction as indicated by the arrow line in Figs. 1 and 3.

The brake block 3 (Figs. 4, 5 and 11) has a guide slot 11 in the end around which it is oscillated. With this guide slot 11 an eccentric 4 engages which is fixed in a lever 12. The lever 12 is connected, by a connecting rod 7 and by a link 8 (Figs. 1 and 3), to the piston 6. The other end 13 of the brake-block 3 is also hingedly connected to the piston 6 by the link 8. In the brake block holder 2 a bolt 5 is fixed (Fig. 10) on which the bolt 4 having a corresponding eccentric boring is mounted so that it can rotate around the bolt 5 fixed on the brake block holder 2.

The operation is as follows:—

When the brake is being applied, the end 13 of the brake-block 3 is pressed against the friction-surface 15 of the brake drum 1. If the slot 11 did not exist the end 13 of the brake block 3 would be pressed against the brake drum 1 only on a small portion of the length of the lining 14 of the brake. However, owing to the slot 11, the entire length of the brake block 3 can bear on the friction-surface of the brake drum 1. This effect is produced as the brake drum moves the brake block 3 (Figs. 3 and 5) in its direction of rotation as indicated by the arrow-lines in Figs. 1, 3 and 4, so that the end of the brake block 3, having the slot 11, moves from the position shown in Fig. 4 into the position shown in Fig. 5. At the same time at the introduction of the braking movement the lever 12 has moved under the action of the piston 6 and of the links into the position shown in Figs. 3 and 5. The eccentric 4 has thus been turned around the bolt 5, fixed on the brake block holder 2 and eccentrically mounted in the eccentric 4, so that the end of the brake block 3, having the slot 11, has been moved towards the brake drum 1 a distance equal to the path X of the friction-surface 15 (Figs. 6 and 8), the end of the brake block 3 being also pressed strongly against the friction surface 15 of drum 1 by the eccentric-action. The amplitude of the angle α (Figs. 4 and 5) has to be selected in accordance with the desired braking effect. The eccentric mounting of the lever 12 with the eccentric 4 on the bolt 5 serves further for the purpose to effect, at the releasing of the brake, the moving of the brake block 6 out of the jammed position (Figs. 3 and 5). At the releasing of the brake the piston 6 moves from the position shown in Fig. 3 into the position shown in Fig. 1, the end 13 of the brake-block 3 being moved away from the friction-surface 15. The end 13 of the brake block 3 has also been moved away from the friction surface 15. At the same time the lever 12 has assumed the position shown in Figs. 1 and 4 so that also the end of the brake block 3, having the slot 11 is pulled away from the friction-surface 15. The detaching of the brake block 3 is assisted by the two pull-springs 9 (Figs. 2 and 3).

The eccentric arrangement of eccentric 4 on bolt 5 (Figs. 9 and 10) may also be utilized for readjusting the brake block 3, when the brake-lining 14 is worn. The readjusting is effected by loosening the nut 16 (Fig. 10) which holds the bolt 5 on the brake-block holder and by the rotation of the bolt 5 which, with this object in view, has a projection 17 for a wrench.

When the brake drum 1 rotates in opposite direction, i. e. at backward running, the brake block 3 is also pressed against the friction-surface over its entire braking-surface.

I claim:—

A brake mechanism for motor vehicles, comprising in combination with the brake drum, one single brake block having an oblong slot in one end, a piston linked to one end of said brake block and adapted to press said brake block against said brake drum, an eccentric engaging with said oblong slot for guiding obliquely said brake block and adapted to press said brake block against said brake drum, a lever carrying said eccentric, a rod hingedly connected to said lever, and a link connecting said rod to said piston.

In testimony whereof I affix my signature.

EMANUEL WIECZOREK.